United States Patent [19]

Michel

[11] 3,928,016

[45] Dec. 23, 1975

[54] PROCESS OF MANUFACTURING PHOSPHATE FERTILIZER

[76] Inventor: Robert Michel, 1000 N. Ashley Drive, Suite 800, Tampa, Fla. 33602

[22] Filed: May 22, 1973

[21] Appl. No.: 362,869

[52] U.S. Cl. ................................................. 71/42
[51] Int. Cl.² ........................................ C05B 11/16
[58] Field of Search ............... 71/33, 34, 36, 42, 51, 71/44; 423/308, 311, 312

[56] References Cited
UNITED STATES PATENTS

| | | | |
|---|---|---|---|
| 2,111,532 | 3/1938 | Hagood | 71/33 |
| 2,750,270 | 6/1956 | Barnes | 71/34 |
| 2,769,704 | 11/1956 | Andres et al. | 71/37 |
| 2,968,543 | 1/1961 | Nees | 71/37 |
| 3,416,910 | 12/1968 | Legal et al. | 71/37 X |

FOREIGN PATENTS OR APPLICATIONS

| | | | |
|---|---|---|---|
| 698,756 | 10/1953 | United Kingdom | 71/42 |

*Primary Examiner*—Charles N. Hart
*Attorney, Agent, or Firm*—Toren, McGeady and Stanger

[57] ABSTRACT

In the disclosed process of manufacturing phosphate fertilizer, a mixture of crushed phosphate rock, water and a catalyst in the form of a water-soluble metal salt of a transition metal is prepared. The pH value of the mixture is adjusted to the alkaline range and the mixture is permitted hydrolytically to degrade until a phosphate fertilizer of a high A.P.A. value is obtained.

9 Claims, No Drawings

PROCESS OF MANUFACTURING PHOSPHATE FERTILIZER

FIELD OF INVENTION

The invention is concerned with phosphate fertilizer and is particularly directed to a low temperature procedure for hydrolytically converting crushed phosphate rock into phosphate fertilizer of a high available phosphoric acid content (A.P.A.).

BACKGROUND INFORMATION

Phosphate fertilizer comprises soil-soluble phosphates and is produced from phosphate rock. Phosphate rock, however, contains phosphorus in water- or soil- insoluble form and thus has to be processed so as to render the phosphorus soil-soluble, thereby making it available to plants.

A variety of processes have been proposed for converting phosphate rock into phosphate fertilizer. The majority of the conventional procedures are based on the formation of monocalcium phosphate, $CaH_4(PO_4)_2$, a water-soluble compound, and some dicalcium phosphate, $CaHPO_4$, which is ammonium-citrate soluble. The potency of the ultimate phosphate fertilizer obtained is usually expressed in terms of "available phosphoric acid" (A.P.A.), the expression in question indicating the amount of phosphorus, calculated as $P_2O_5$, that is soluble under certain specified test conditions. (See the "Official Methods of the Association of Official Agricultural Chemists," 10th Edition, 1965.)

Most of the phosphate fertilizer which is used for agricultural purposes is a product generally known as superphosphate. Superphosphate is manufactured by treating phosphate rock with sulfuric acid, thereby forming a mixture which predominantly consists of monocalcium phosphate and calcium sulfate. Superphosphate has an A.P.A. value of about 18–21%, depending on the grade and quality of the phosphate rock used as starting material.

By treating phosphate rock with phosphoric acid, as distinguished from sulfuric acid, products having an A.P.A. value of 43–50% can be obtained. These high potency fertilizers are marketed under various names and are generally referred to as triple superphosphate. Triple superphosphate which thus is characterized by its high A.P.A. value, is comparatively expensive.

According to another procedure for converting phosphate rock to phosphate fertilizer, the phosphate rock, in admixture with, for example, silica, is heated at very high temperatures with an alkaline substance such as sodium hydroxide, potassium hydroxide, magnesium hydroxide and the like. Temperatures in excess of 1,200°C are usually employed in this process. This procedure results in the formation of a product which primarily consists of meta-phosphate and alkali-silicates.

The prior art processes for converting phosphate rock into phosphate fertilizer have all in common that they are expensive to carry out and require considerable expenditure in chemicals and/or plant equipment. They thus make use of strong mineral acids or strong bases and the processes are usually carried out at high temperatures which in turn requires elaborate installations and costly materials for the plant equipment, such as refractories, stainless steel and the like.

SUMMARY OF THE INVENTION

The primary object of the present invention is to overcome the drawbacks and disadvantages of the prior art procedures for converting phosphate rock into phosphate fertilizer and to propose a procedure which is exceedingly simple to perform, does not require elaborate equipment or expensive reactants and results in a phosphate fertilizer of excellent quality and high A.P.A. values.

Another object of the present invention is to provide a procedure for the indicated purpose which can be carried out at room temperature or only slightly elevated temperature, thereby obviating costly installations.

Generally, it is an object of the present invention to improve on the art of phosphate fertilizer manufacture as presently practised.

Briefly, and in accordance with this invention, a mixture is prepared from crushed or comminuted phosphate rock, water and a catalyst which is a water-soluble metal salt of a transition metal of the Periodic Table. The pH of the mixture is adjusted to an alkaline value and the mixture is then permitted to react until soil-soluble phosphate has been formed.

The procedure is accelerated by heating the mixture to an elevated temperature, the best results being obtained in the temperature range of between about 20°–80°C. If the temperature is raised to above about 80°C, more complicated and temperature resistant equipment is necessary.

Tests have indicated that phosphate fertilizer of A.P.A. values of 30% and more are readily obtained by the inventive procedure, the specific A.P.A. value, of course, being dependent on process conditions and the nature and grade of the phosphate rock.

In essence and in accordance with the inventive procedure, the crushed phosphate rock, by the presence of the water and the catalyst, is subjected to a controlled hydrolytic degradation in the alkaline pH range, thereby modifying the structure of the phosphate rock and resulting in a soil-soluble phosphate, the ultimate phosphate fertilizer having a relatively high A.P.A. value. As stated, the hydrolytic degradation is facilitated and expedited at elevated temperatures.

The preferred and most advantageous parameters for the inventive procedure will now be discussed:

I. PHOSPHATE ROCK

The inventive procedure is applicable to all available phosphate rock, the ultimate A.P.A. content of the phosphate fertilizer being dependent on the grade of phosphate rock initially used. Although the particle size of the crushed rock is not critical, the best results are obtained with relatively small particle sizes. Tests have indicated that excellent results are obtained if about 90% of the crushed rock pass through a 200 mesh sieve, but other particle sizes are, of course, also feasible.

II. WATER

Good results are obtained if the weight ratio of rock:water is about 3:1–1:3. Phosphate rock such as, for example, fluor apatite, when mined and prior to crushing, usually contains about 5–10% of water. After crushing and water washing, the water content rises to about 15–20%. Since, in accordance with the inventive procedure, the weight ratio between phosphate rock and water is, preferably, between about 3:1–1:3, the water washed crushed rock need not be dried. This is of considerable advantage if compared with prior art procedures wherein drying after the water washing is usually required.

III. CATALYST

The catalysts are water-soluble metal salts of transition metals. Excellent results have been obtained with metal salts of the following metals: Al, Ti, V, Cr, Mn, Fe, Co, Ni, Cu, Zn and Mo. It will be noted that all these metals are between the atomic numbers 13 (Al) and 42 (Mo), inclusive. The metals are used in soluble salt form and a mixture of several metal salts of the same metal or salts of different metals may be used.

For economy reasons it is, of course, desirable to keep the amount of metal salt catalyst as low as possible. Generally, very good results are obtained if the amount of metal ion is about 0.1 to 3% calculated on the amount of phosphate rock.

IV. pH

As stated hereinabove, the pH of the mixture should be adjusted to an alkaline value, the most desirable results being obtained if the pH is between about 7.5 to 9. Unless the pH of the mixture is inherently within the indicated range, proper adjustment can be made by adding small amounts of sodium hydroxide solution, potassium hydroxide solution or the like alkaline substance. Due to the alkaline pH, the metal is rendered colloidal and is homogeneously distributed throughout the mixture.

V. TEMPERATURE

While the hydrolytic degradation proceeds at room temperature, it will be appreciated that room temperature conversion is relatively slow. Accordingly, it is recommended that the reaction be carried out at slightly elevated temperature up to about 80°C. Temperatures above 80°C are not recommended unless the operator is prepared to invest in special equipment. The hydrolytic degradation, of course, proceeds at higher temperatures as well.

VI. TIME

At temperatures between 50°–80°C the conversion is usually completed within 2–5 hours dependent on various factors such as the mesh size of the crushed rock, the equipment in which the conversion takes place, the nature and amount of catalyst and the like.

As will be appreciated from the above, the inventive hydrolysis is catalyzed by the metal ions of the indicated kind.

Whereas hydrolytic degradation of phosphate rock at a neutral pH and at ambient temperature, to wit, room temperature, is practically zero, the degradation significantly increases with increasing temperature and with a pH within the alkaline range.

As stated, due to the alkaline pH value of the mixture the metal salts are converted into colloidal systems of metal oxides or other metal compounds, which are thus formed in situ in the system during the hydrolytic degradation.

Although any of the indicated metal ions may be used for the inventive purposes, from a practical and economical point of view iron and/or aluminum salts are particularly suitable. These may be used in combination with bivalent cations such as cobalt or nickel.

A suitable catalyst for the inventive procedure is thus, for example, iron sulfate. The iron sulfate or for that matter any other metal salt may be used in technical grade purity.

A cumulative effect is obtained by increasing the temperature up to 80°C and by using suitable combinations of cations. As stated, the metal ions are used in relatively small quantities of about 0.1 to 3%.

The invention will now be described by various examples, it being understood that these examples are given by way of illustration and not by way of limitation and that many changes may be effected without affecting in any way the scope and spirit of the invention as recited in the appendant claims.

EXAMPLE 1

100 kg of phosphate rock of Morocco origin and having a $P_2O_5$ content of 33.2%, are crushed to a grain or particle size so that 90% of the crushed rock pass through a 200 mesh sieve. The crushed rock is then admixed with technical grade iron sulfate, the amount of iron sulfate corresponding to an iron content of 3 kg. Moreover, vanadium hydroxide in a quantity corresponding to a vanadium content of 0.1 kg and cobalt sulfate in a quantity corresponding to a cobalt content of 0.2 kg, are added. Finally, the mixture thus obtained is admixed with 20 kg of water. The crushed phosphate rock had an initial water content of 15 kg of water so that the total water content is about 35 kg.

The mixture thus obtained is introduced into a ball-mill and is ground for 1 hour at room temperature while diluted sodium hydroxide solution is added to adjust the pH to a value of between 7.5 and 8.5. The mixing in the ball-mill is continued for about 3 hours which resulted in a colloidal system. The formation of the colloidal system is ascertained by pouring a small sample into a vertical test tube or column. The colloidal state is reached when no separation of water or settling of the suspension takes place. The mixing in the ball-mill is then discontinued and the mixture permitted to stand for 8 hours at room temperature. The colloidal mass is then introduced into a heater and heated slowly to a temperature of about 80°C. The product is then dried and cooled. The product is a phosphate fertilizer in which an A.P.A. content of 30.1% is ascertained.

The following Table illustrates the results of further tests, with the starting materials, to wit, the phosphate rock, either being of Florida or Morocco origin.

TABLE

| Example No. | Cation kg | pH | $P_2O_5$: per cent | citrate test |
|---|---|---|---|---|
| 2 | $Al_2(SO_4)_3$ 2 kg | 7.5–8.5 KOH | 18.0 | solid |
| 3 | $Fe_2(SO_4)_3$ 3 kg | 7.5–8.5 NaOH | 25.0 | soft |
| 4 | $Fe_2(SO_4)_3$ 3 kg V-hydroxide 0.1 kg $CoSO_4$ 0.2 kg | 7.5–8.5 NaOH | 30.1 | soft |
| 5 | $Fe_2(SO_4)_3$ 2 kg $ZnSO_4$ 1 kg $Co(NO_3)_2$ 0.2 kg | 7.5–9.0 NaOH | 29.8 | solid |
| 6 | $MgCl_2$ 3 kg $Co(NO_3)_2$ 0.1 kg | 7.5–9.0 NaOH | 24.5 | solid |
| 7 | $Fe_2(SO_4)_3$ 3 kg $Co(NO_3)_2$ 0.2 kg | 7.5–9.0 KOH | 29.3 | soft |

It will be appreciated from the above that the inventive procedure results in phosphate fertilizer having an A.P.A. content of between about 20–30%. From a commercial point of view it is advantageous to mix the final fertilizer product with nitrogen compounds and potassium compounds and to pelletize the product since, as is well know, nitrogen, phosphorus and potassium are the principal elements which should be supplied by fertilizers.

Further, the inventive phosphate fertilizer may be converted into a so-called microfertilizer. As is known, in order to obtain high and stable yields of farm crop, it is recommended to enrich the soil, in addition to nitrogen, phosphate and potassium, with microelements such as boron, copper, molybdenum, zinc, cobalt and other trace elements. It will be appreciated that the inventive fertilizer can be readily compounded to qualify as microfertilizer.

It will also be realized that if low grade phosphate rock is used as raw material for the inventive procedure, the final A.P.A. percentage value may be lower than indicated hereinabove. Thus, A.P.A. values of 20% or less may be obtained. However, it will also be understood that without requiring additional equipment, phosphoric acid or other phosphates may be added to the fertilizer at the end of the wet process stage, thereby to raise the A.P.A. value to a desired degree.

What is claimed is:

1. A process of manufacturing phosphate fertilizer from phosphate rock, which comprises preparing a mixture of crushed phosphate rock, water, and a catalytically effective amount of a catalyst which is a water-soluble iron salt, adjusting the pH of the mixture to an alkaline value and permitting the mixture thus obtained to react at a temperature between about 20° to 80°C until soil-soluble phosphate has been formed.

2. A process as claimed in claim 1, wherein the weight ratio of phosphate rock to water in the mixture is between about 3:1–1:3.

3. A process as claimed in claim 1, wherein said crushed phosphate rock has a particle size so that the major portion of the rock passes through a 200 mesh sieve.

4. A process as claimed in claim 1, wherein the amount of said metal ion is about between 0.1 to 3% by weight calculated on the amount of phosphate rock.

5. A process as claimed in claim 1, wherein said alkaline pH value is about 7.5 to 9.

6. A method as claimed in claim 1, wherein said pH value is adjusted by adding to the mixture an alkaline substance.

7. A process as claimed in claim 1, wherein said iron salt is iron sulfate.

8. A method of manufacturing phosphate fertilizer, having a high A.P.A. value from phosphate rock, which comprises preparing a mixture containing
 a. crushed phosphate rock;
 b. water, the weight ratio of phosphate rock to water being between about 3:1–1:3;
 c. 0.3 to 3% by weight, calculated on the amount of phosphate rock, of Fe-ion, adjusting the pH of the mixture to a value of between about 7.5 to 9 and permitting the mixture hydrolytically to degrade at a temperature of about between 20°–80°C.

9. A method as claimed in claim 8, wherein said Fe is present in the form of iron sulfate.

* * * * *